July 15, 1952     J. W. SMITH     2,602,974

FILM LEADER

Filed Sept. 24, 1948

INVENTOR.
JOHN WESLEY SMITH
BY
ATTORNEYS

Patented July 15, 1952

2,602,974

UNITED STATES PATENT OFFICE 2,602,974

FILM LEADER

John Wesley Smith, Norristown, Pa., assignor to Philadelphia Air Transport Company, Norristown, Pa., a corporation of Pennsylvania Application September 24, 1948, Serial No. 51,033

1 Claim. (Cl. 24—81)

This invention relates to a film leader adapted for attachment to the end of a photographic film for facilitating processing of the film or for coupling lengths of film end to end for processing.

In the processing of photographic film strips it is usually necessary to secure to the end of a film a leader for introducing the film into a processing apparatus and it is also necessary to couple the film strips together to provide a long strip. Heretofore, leaders of material similar to the film base have been cemented or stapled to the ends of film strips and when film strips have been joined together such joining has also been by cementing or stapling. Both of these procedures require special apparatus and in the case of stapling there is likely to occur tearing of the film, particularly if the film is of substantial width. In either case, the securing of the film to a leader or to another film can only be successfully accomplished when the film is dry since wet films cannot be cemented and are so weak that stapling is quite unreliable.

It is one object of the present invention to provide a leader or coupler which is adapted for secure attachment to a film end whether wet or dry. In accordance with the invention a gripping arrangement is provided into which there may be easily inserted the folded end of a film by a relative lateral motion, the gripping device then securely holding the film against relative lengthwise tension.

Figure 1:
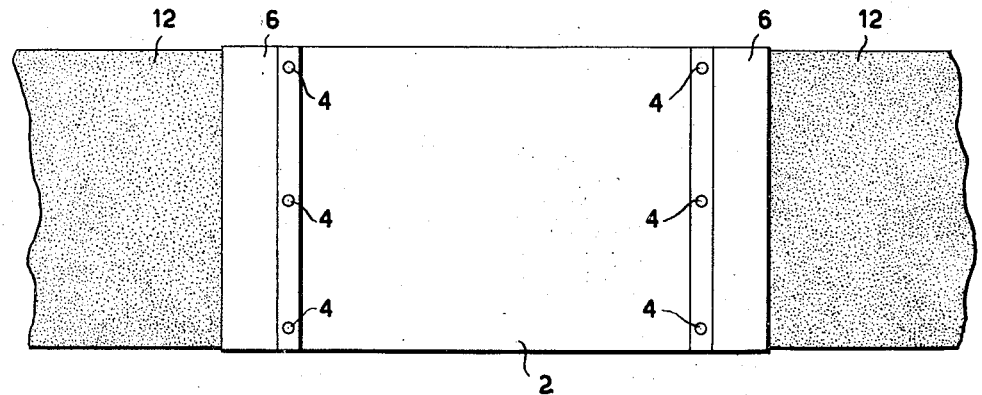
Figure 2:
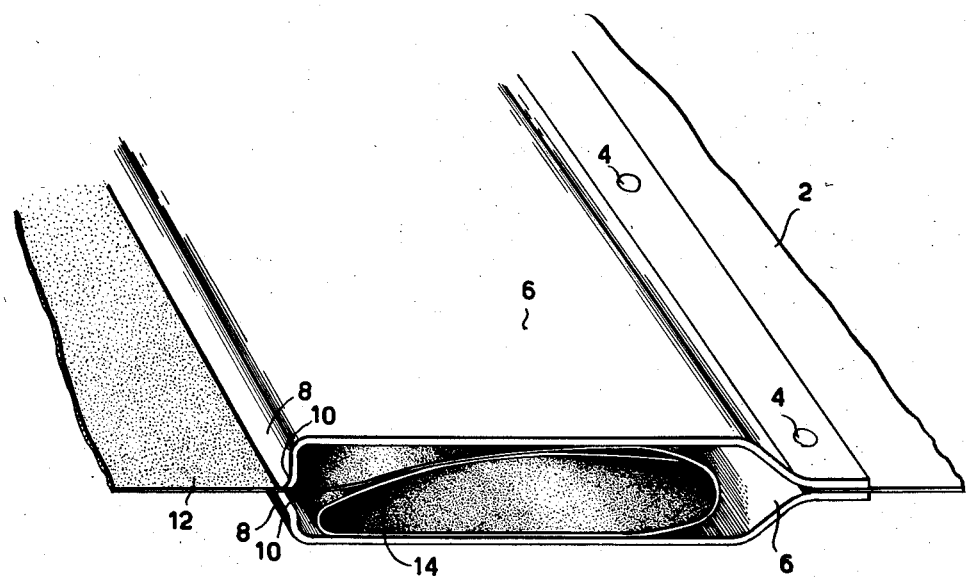

The foregoing general object of the invention as well as subsidiary objects relating to details of construction will become apparent from the following description read in conjunction with the accompanying drawing in which:

Figure 1 is a plan view illustrating the application of the invention to a coupler for joining the ends of film strips; and Figure 2 is an enlarged perspective view showing details of construction.

A strip 2 of suitable material, such as stainless steel or other non-corrodible metal, has secured thereto, for example, by spot welding 4, a clip assembly comprising a pair of jaw elements 6 which, for example, may also be formed of stainless steel. These elements 6 as indicated most clearly in Figure 2 provide between them a space which, at its outer end, is delimited by a pair of inwardly directed jaws 8, the ends of which are rounded for the easy insertion of a film 12, the end of which is provided with a fold indicated at 14. While the elements 8 have been referred to as jaws they need not have any substantial clamping action upon the faces of the film: each element 6 may be made of stainless steel or other non-corrodible metal of a gauge which will provide some spring action urging the jaws 8 toward each other, but alternatively the members 6 may be made substantially rigid with provision between the jaws of a spacing substantially equal to or somewhat greater than the thickness of the film to be associated therewith. It has been found satisfactory, for example, to form the members 6 of stainless steel of a thickness of about 0.020 inch. A material of sufficient thickness should be used so that under any expected tension the jaw members will not be sprung apart to any substantial extent.

The use of the device will now be apparent. The end of a strip of film which may be either wet or dry is folded over as indicated, for example, in Figure 2, and inserted laterally between the jaws 8 with the fold in the space between the members 6. The film has sufficient rigidity and there is sufficient friction to prevent the film from being pulled lengthwise from between the jaws, folds being held in flattened condition by the members 6 so that the film folds will not be pulled out by unrolling. A secure engagement of the device with the end of the film is thus obtained. Removal of the film from the device is readily effected merely by a relative lateral movement.

Desirably, the thickness of the strip 2 is such as to cause the device between its ends to have a flexibility comparable with that of the film so that in continuous processing it may, with the film, pass about guiding rollers of small diameter. It has been found, for example, quite satisfactory to use stainless steel having a thickness of about 0.007 inch. Thinner material may be used, for example, in the case of stainless steel down to about 0.004 inch which represents about a practical limit since thinner stainless steel is rather likely to become permanently bent and also has such sharp edges as would make handling relatively difficult.

In the case of a coupling such as is illustrated specifically, it is desirable to have a length of strip 2 between the more rigid structures constituted by the elements 6 such that the entire coupling will have good flexibility enabling it to pass readily about rollers of diameters less than two inches. In case, however, a leader is desired this strip may be of any length and may have the film engaging structure only at one end thereof.

The couplers or leaders in accordance with the invention may be made of any desired widths to accommodate any of the usual motion picture or strip films. The width may correspond precisely to the width of the film so that the leader or coupler may pass through lateral guides designed to engage and guide the edges of a film.

It will be evident from the foregoing that the device described may be formed of various materials and constructed in numerous specific ways without departing from the scope of the invention as defined in the following claim.

What I claim and desire to protect by Letters Patent is:

A film gripping device of the type described comprising a substantially inexpansible flat sheet of flexible material having affixed to each end thereof a pair of opposed jaw members of flat form, said jaw members each comprising a pair of parallel portions substantially less flexible than said sheet and providing between the parallel portions a flat space for the reception of a folded end of a film, the space being delimited at its outer end by a pair of inwardly directed flanges of said jaw members having adjacent edges facing each other, said jaw members being arranged to receive between them the thickness of the film.

JOHN WESLEY SMITH.

REFERENCES CITED

The following references are of record in the file of this patent:

UNITED STATES PATENTS

| Number | Name | Date |
| --- | --- | --- |
| 290,698 | Michel | Dec. 25, 1883 |
| 1,130,126 | Wooden | Mar. 2, 1915 |
| 1,868,269 | Beadle | July 19, 1932 |
| 1,935,685 | White | Nov. 21, 1933 |
| 2,066,732 | Kunz | Jan. 5, 1937 |
| 2,130,459 | Cohn | Sept. 20, 1938 |

FOREIGN PATENTS

| Number | Country | Date |
| --- | --- | --- |
| 138,614 | Switzerland | May 16, 1930 |
| 343,784 | Germany | Nov. 9, 1921 |
| 413,060 | Great Britain | Mar. 3, 1933 |
| 516,006 | France | Apr. 12, 1921 |
| 636,048 | Germany | Oct. 3, 1936 |